United States Patent
Lees

(10) Patent No.: US 8,035,521 B2
(45) Date of Patent: Oct. 11, 2011

(54) RADIO FREQUENCY DATA READER

(75) Inventor: Stewart D. Lees, Dundee (GB)

(73) Assignee: NCR Corporation, Duluth, GA (US)

( * ) Notice: Subject to any disclaimer, the term of this patent is extended or adjusted under 35 U.S.C. 154(b) by 486 days.

(21) Appl. No.: 12/220,845

(22) Filed: Jul. 29, 2008

(65) Prior Publication Data

US 2010/0026494 A1 Feb. 4, 2010

(51) Int. Cl.
G08B 13/14 (2006.01)
(52) U.S. Cl. .............. 340/572.4; 340/572.1; 340/572.2; 340/572.3; 340/572.5; 340/572.6; 235/375; 235/376; 235/377; 235/380; 235/385
(58) Field of Classification Search .............. 340/572.4, 340/572.1–572.9; 235/375–385
See application file for complete search history.

(56) References Cited

U.S. PATENT DOCUMENTS

| | | | |
|---|---|---|---|
| 2004/0071291 A1 | 4/2004 | Romain et al. | |
| 2006/0082458 A1* | 4/2006 | Shanks et al. | 340/572.4 |
| 2007/0034691 A1* | 2/2007 | Davis et al. | 235/382 |
| 2009/0291668 A1* | 11/2009 | Huang et al. | 455/410 |

FOREIGN PATENT DOCUMENTS

EP 1 898 337 A1 3/2008

OTHER PUBLICATIONS

ISO/IEC FCD 14443-3: "ISO/IEC 14443-3 Identification cards—Contactless integrated circuit(s) cards—Proximity cards—Parts 3: Initialization and anticollision", ISO/IEC JTC1/SC17 N1531, XX, XX, Jun. 11, 1999.
Klaus Finkenzeller: "RFID Handbook Chapter 10", 1999, Wiley<Chichester, XP002539562.
Klaus Finkenzeller: "RFID Handbook Chapter 11", 1999, Wiley, Chichester, XP007909588.

* cited by examiner

Primary Examiner — George Bugg
Assistant Examiner — Ojiako Nwugo
(74) Attorney, Agent, or Firm — Paul W. Martin

(57) ABSTRACT

An RFID or NFC reader is associated via a data link with a tag module such that when the reader transmits an interrogation signal the tag module responds with a random, or constrained random, information signal. The information signal masks a signal transmitted by an RFID or NFC tag which the reader is interrogating, making fraudulently obtaining details contained in the tag transmission more difficult.

12 Claims, 2 Drawing Sheets

RADIO FREQUENCY DATA READER

FIELD OF THE INVENTION

This invention relates to a radio frequency data reader. More particularly, but not exclusively, the invention relates to a masked radio frequency data reader.

BACKGROUND TO THE INVENTION

Radio frequency identification (RFID) and near field communications (NFC) devices are becoming increasingly used for storing sensitive personal information, for example RFID tagged passports and the use of electronic wallets. This storage of sensitive personal information on RFID and NFC devices makes the devices targets for identity theft, for example passports have been cloned whilst on route to their rightful owners based upon information extracted from an RFID tag embedded in the passport, the RFID tag having been read through the envelope in which the passport was contained.

The use of electromagnetically shielded wallets can reduce the likelihood of identity theft from high frequency (HF) and ultra-high frequency (UHF) RFID tags whilst they are not being actively used. However, at the point of use, for example when paying for goods or service, the RFID tag must be removed from its shielded wallet and is vulnerable to being read by a skimming reader. Currently, attempts have been made to cryptographically protect data stored on the RFID tag. For example, "rolling code" schemes have been used in which the tag identifier information is altered after each scan, this reduces the re-usability of any data captured by a third party. More sophisticated devices use "challenge and response authentications" protocols using symmetric key cryptography, where a reader challenges a tag, the tag responds with an encrypted response based upon an embedded symmetric key.

Such cryptographically based protections have a number of disadvantages associated with them, in particular higher production cost and power consumption compared to that of non-encrypted RFID tags. Additionally, the limited computational power available in RFID tags precludes the employment of powerful encryption.

A further problem associated with current RFID tag systems is the susceptibility of tag readers to denial of service (DoS) in which the reader is swamped by spurious signals. This reduces the availability of the RFID reader which can, for example result in lost sales and revenue. There is currently no ready way to detect an attempted DoS attack, other than the failure of the reader.

SUMMARY OF THE INVENTION

According to a first aspect of the present invention there is provided an RFID tag reader comprising:
a reader module arranged to emit an interrogation signal and to receive random identifier data from a tag module and identifier data received from a remote RFID tag, if present, and to discriminate therebetween.

It will be appreciated that the term "RFID" as used herein encompasses both standard RFID technologies and NFC technologies.

The generation and transmission of random identifier data by the tag module provides an additional signal that will be received by a skimming tag reader, which cannot be readily distinguished from the identification data transmitted from a legitimate RFID tag by the skimming tag reader.

The tag reader be arranged to receive random identification data from each of a plurality of tag modules in response to the interrogation data. The plurality of tag modules may be distributed about the tag reader. Each of the plurality of tag modules may be arranged to pass respective identification data to the reader module, via a second data link, which may be arranged to discriminate between the respective random identifier data and identifier data received from a remote RFID tag, if present.

The provision of a number of tag readers each transmitting a random identification data further confuses a skimming reader that is trying to capture data associated with a RFID tag present.

The reader module may comprise a processor. The reader module processor may be operable to discriminate between random identifier data and data received from a remote RFID tag, if present.

The reader module may comprise an aerial. The reader module processor may be arranged to monitor received data and to generate an alarm signal if random identifier data is received from the processor of the tag module and corresponding random identifier data is not received at the aerial. The alarm signal may be indicative of a DoS attack.

This comparison of data received from the processor of the tag module and at an aerial of the reader module allows monitoring for DoS attacks as a DoS attack will result in random identifier data transmitted by the tag module not being received at the reader module.

The reader module and the tag module may have a common processor. The reader module and the tag module may comprise respective discrete processors.

According to a second aspect of the present invention there is provided a tag module comprising a processor and an aerial;
the aerial being arranged to receive the interrogation signal and to pass the interrogation signal to the processor; and
the processor being arranged to generate random identifier data in response to receiving the interrogation signal and to pass the random identifier data to both the aerial and to a reader module, the aerial is further arranged to transmit the random identifier data.

According to a third aspect of the present invention there is provided an RFID tag reader comprising:
a reader module; and
at least one tag module comprising a processor and an aerial;
the reader module being arranged to emit an interrogation signal;
the at least one tag module comprising a processor and an aerial, the aerial being arranged to receive the interrogation signal and to pass the interrogation signal to the processor, the processor is arranged to generate random identifier data in response to receiving the interrogation signal and to pass the random identifier data to both the aerial and the reader module, the aerial is further arranged to transmit the random identifier data; and wherein
the reader module is arranged to receive the random identifier data and identifier data received from a remote RFID tag, if present, and to discriminate therebetween.

The tag reader may comprise a plurality of tag modules. The plurality of tag modules may be distributed about the tag reader. Each of the plurality of tag modules may be arranged to transmit respective random identification data in response to receiving the interrogation signal emitted by the reader module. Each of the plurality of tag modules may be arranged to pass respective identification data to the reader module, via a second data link, which may be arranged to discriminate between the respective random identifier data and identifier data received from a remote RFID tag, if present.

The provision of a number of tag readers each transmitting a random identification data further confuses a skimming reader that is trying to capture data associated with a RFID tag present.

Each tag module may comprise one of the following: a passive RFID tag, a semi-passive RFID tag, an active RFID tag.

The provision of a number of tag readers each transmitting a random identification data further confuses a skimming reader that is trying to capture data associated with a RFID tag present.

The reader module may comprise a processor. The reader module processor may be operable to discriminate between random identifier data and data received from a remote RFID tag, if present.

The reader module may comprise an aerial. The reader module processor may be arranged to monitor received data and to generate an alarm signal if random identifier data is received from the processor of the tag module and corresponding random identifier data is not received at the aerial. The alarm signal may be indicative of a DoS attack.

This comparison of data received from the processor of the tag module and at an aerial of the reader module allows monitoring for DoS attacks as a DoS attack will result in random identifier data transmitted by the tag module not being received at the reader module.

The reader module and the tag module may have a common processor. The reader module and the tag module may comprise respective discrete processors.

According to a fourth aspect of the present invention there is provided a method of reducing the likelihood of fraudulent interception of data transmitted from a RFID tag comprising the steps of:
  i) emitting an interrogation signal by a reader module; and
  ii) transmitting a random data set from a tag module associated with the reader module in response to the tag module receiving the interrogation signal.

The method may comprise transmitting respective random data sets from each of a plurality of tag modules associated with the reader module in response to the plurality of tag modules receiving the interrogation signal.

According to a fifth aspect of the present invention there is provided a method of detecting a DoS attack comprising the steps of:
  i) emitting an interrogation signal by a reader module;
  ii) transmitting a random data set from a tag module associated with the reader module in response to receiving the interrogation signal;
  iii) passing the random data set to the reader module via a second data connection; and
  iv) monitoring the output of an aerial of the reader module in order to determine if a signal corresponding to the random data set is received at the aerial.

The method may comprise generating an alarm signal indicative of a DoS attack if a signal corresponding to the random data set is not received at the aerial.

According to a sixth aspect of the present invention there is a method of improving the availability of a customer interaction point comprising the steps of:
  i) determining if a DoS attack is occurring according to the method of the third aspect of the present invention; and
  ii) disabling RFID capability of the customer interaction point temporarily.

The method may comprise comparing the output of the reader module's aerial to random data sets received from the tag module to determine when the DoS attack is over and re-enabling the RFID capability of the customer interaction point if it is determined that the DoS attack is over.

According to a seventh aspect of the present invention there is provided software, which when executed upon a processor, causes the processor to generate a random data set in response to an output from an aerial indicating that an interrogation signal has been received at the aerial, and further causes the processor to pass a signal corresponding to the random data set to the aerial for transmission.

According to a eighth aspect of the present invention there is provided software, which when executed upon a processor, causes the processor to receive a random data set generated at a processor of a tag module and monitor the output of an aerial to determine if a signal corresponding to the random data set is received at the aerial, and to discriminate between a random data set received at the aerial, if received, and a signal from a remote RFID tag, if received.

The software may, when executed upon the processor, cause the processor to generate an alarm signal indicative of a DoS attack if a signal corresponding to the random data set is not received at the aerial.

According to a ninth aspect of the present invention there is provided software according to both the seventh and eighth aspects of the present invention.

According to an tenth aspect of the present invention there is provided a data carrier bearing software according to any one of the seventh, eighth or ninth aspects of the present invention.

According to a eleventh aspect of the present invention there is provided a method of improving the security of a wirelessly enacted transaction comprising using an RFID tag reader according to either the first or the third aspect of the present invention to enact said transaction.

According to a twelfth aspect of the present invention there is provided a method of improving the security of a wirelessly enacted transaction comprising the steps of:
  i) emitting an interrogation signal by a reader module; and
  ii) transmitting a random data set from a tag module associated with the reader module in response to the tag module receiving the interrogation signal.

According to a thirteenth aspect of the present invention there is provided a method of improving customer confidence in the security of a wirelessly enacted transaction comprising advertising the use of an RFID tag reader according to either of the first or the third aspect of the present invention.

According to a fourteenth aspect of the present invention there is provided a method of reducing the likelihood of fraudulent interception of data transmitted from a RFID tag, comprising masking the data transmitted from the RFID tag by at least one structurally similar data set transmitted from another source, the other structurally similar data set having a different content from that transmitted from the RFID tag.

The method may comprise masking the data transmitted from the RFID tag a plurality of structurally similar data set transmitted from other sources, the other structurally similar data sets having different content from that transmitted from the RFID tag.

The method may comprise transmitting the, or each, structurally similar data set from a respective source associated with an RFID tag reader.

According to a fifteenth aspect of the present invention there is provided a radio-frequency signal comprising data having a format corresponding to that expected at an RFID tag reader and random, or constrained random, content.

The signal may comprise data corresponding to data passed to the RFID tag reader via another data link.

BRIEF DESCRIPTION OF THE DRAWINGS

At least one preferred embodiment of the present invention will now be described, by way of example only, with reference to the accompanying drawings, in which.

DETAILED DESCRIPTION OF PREFERRED EMBODIMENTS

Figure 1:
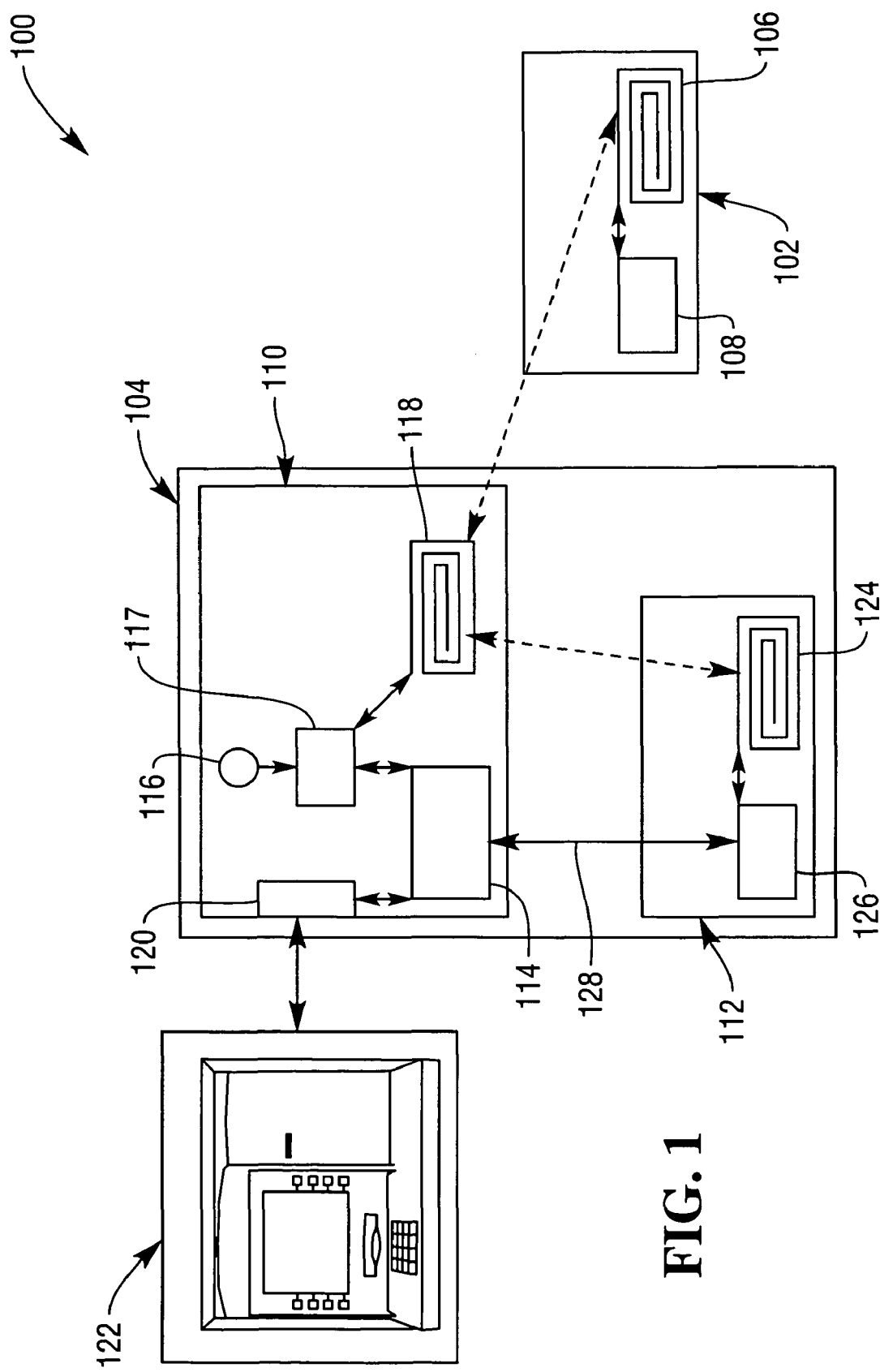
FIG. 1 is a schematic diagram of an embodiment of an RFID transaction system comprising a tag reader according to the third aspect of the present invention and a tag according to the second aspect of the present invention.

Referring now to FIG. 1, an RFID transaction system 100 comprises an RFID tag 102 and a tag reader 104.

RFID tag 102 comprises an aerial 106 and an integrated circuit (IC) 108. The IC 108 stores information, for example the owner's bank account details and authorization codes, processes information, for example a request to access account details and authorization codes, modulates and demodulates received radio-frequency signals. Typically, for high frequency, 3-30 MHz applications the aerial 106 is a lithographically formed metal spiral. For ultra high frequency applications, 300 MHz-3 GHz, a bent or meandered dipole antenna aerial 106 with impedance matching to the IC 108 may be used.

In the present embodiment the RFID tag 102 is a passive RFID tag and will be described in detail as such. However, it will be appreciated that the present invention is equally applicable to semi-passive and active RFID tags as it is to passive RFID tags. A semi-passive tag incorporates a power source that powers the IC. An active tag comprises a power source that powers the IC and provides power to the output of a broadcast signal in response to an interrogation signal from the tag reader 104.

The tag reader 104 comprises a reader module 110 and a tag module 112. The reader module 110 comprises a processor 114, a radio-frequency source 116, a modulator/de-modulator unit 117, an aerial 118 and a communications port 120. The communications port 120 links to a terminal 122 typically a self-service terminal (SST), such as an automated teller machine (ATM), check-in/check out kiosk or medical record/check in kiosk. Alternatively, or additionally, terminal may comprise a point of sale (POS) terminal, identification device, or smart poster.

The tag module 112 comprises an aerial 124 and an integrated circuit (IC) 126. The IC 126 modulates and demodulates radio-frequency signals and generates an information signal.

In use, the radio-frequency source 116 generates a radio-frequency interrogation signal, typically, but not necessarily, a continuous wave (CW) signal, in response to an instruction received from the terminal 122 via the communications port 120. The interrogation signal is modulated onto a carrier wave at the modulation/de-modulation unit 117 and broadcast via the aerial 118. Any suitable modulation unit 117 known to a person skilled in the art can be employed.

The interrogation signal is received at the respective aerials 106, 124 of the tag 102 and the tag module 112.

The IC 108 of the tag 102 extracts sufficient power from the interrogation signal to power its operation. The IC 108 demodulates the interrogation signal, for example in the case of a backscattering passive tag by means of a Schottky diode that is impedance matched to the aerial 106. Other suitable demodulators known to a person skilled in the art can be employed. The IC 108 then determines if the interrogation signal is valid, for example by checking for an embedded security code within the signal. If the interrogation signal is valid, the IC 108 generates an information signal that is to be embedded within a re-modulated output signal. Typically, in the case of financial transactions the information signal contains details of the owner of the tag and their bank or credit card account details. Similarly, in the case of identification transactions, for example an RFID enabled passport, the information signal contains details of the tag owner's identity e.g. name or biometric data, id number e.g. passport number, and any specific permission information required e.g. entry or exit visa.

The output signal is generated at the IC 108 by, for example, modulating a pseudo-random noise sub-carrier by the information signal. The modulated pseudo-random noise sub-carrier is modulated onto the interrogation signal via the Schottky diode de-modulator/modulator to produce a modulated backscatter output signal.

In the tag module 112, the IC 126 demodulates the interrogation signal received from the aerial 124, typically as described in relation to the tag 102. The IC 126 determines if the interrogation signal is valid, for example by checking for an embedded security code within the signal. If the interrogation signal is valid the IC 126 generates an information signal that is to be embedded within a re-modulated output signal. Typically, the information signal has a form consistent with that generated at the tag 102. For example, if the information signal generated at the tag 102 comprises an eight digit account number and a six digit bank sort code separated by a filler data block coded using a particular coding scheme, the tag module IC 126 would generate an information signal having the same structure. Typically, the content of the interrogation signal generated at the IC 126 varies with each interrogation signal received at the tag module 112. However, the content of the information signal generated at the IC 126 will comprise random or constrained random content.

Random content may comprise a string of random numbers or characters generated by either the use of a true random number generator or a pseudo-random number generator. True random number generators can be implemented using jitter of a free running oscillator, amplification of thermal or shot noise or the harvesting of entropy from well matched devices within an SRAM array.

Constrained random content is similar to random content, except that at least part of the content is constrained to conform to expected elements of data received from the tag 102. For example, in a case where all bank sort codes must start with the digit nine accordingly, the sort code part of the information signal generated at the IC 126 will be constrained to start with the digit nine, as if it did not it would be simple for a third party to distinguish it from data transmitted from the tag 102

The output signal is generated at the IC 126 by, for example, modulating a pseudo-random noise sub-carrier by the information signal. The modulated pseudo-random noise sub-carrier is modulated onto the interrogation signal via a modulator to produce a modulated backscatter output signal that is output via the aerial 124. Generally, the de-modulation/modulation scheme employed by the tag module 112 will be similar to, or the same as, that employed by tags 102 expected to be used with the tag reader 104, although this is not essential. However, similarities in the de-modulation/modulation arrangements is advantageous as the power outputs etc. of the tag 102 and tag module 112 will be similar and therefore more difficult to distinguish between to a third party observer.

Typically, the data corresponding to the content of the information signal generated at the tag module's IC 126 is passed to the processor 114 of the reader module 110 via a data link 128.

The tag reader module's aerial 118 receives the output signals from both the tag 102 and the tag module 112. The modulation/de-modulation unit 117 demodulates the output signals and passes them on to the processor 114. The processor 114 compares the data content of the respective received signals to the data received from the tag module 112 in order to discriminate between data received from the tag 102. Data received via the wireless link from the tag module will correspond to that received via the data link 128 whereas data received from the tag 102 will not.

Data received from the tag module 112 is discarded and data received from the tag 102 is passed to the terminal 122 via the communications port 120. The terminal 122 processes the data to either validate and complete a transaction, or to refuse completion of the transaction. The exact nature of the transaction validation will depend upon the transaction being undertaken.

In the case of a third party monitoring the operation of the RFID transaction system 100 the output signals of the tag 102 and the tag reader module 112 would both appear to be valid responses to the interrogation signal. Without knowledge of which data set was transmitted by the tag 102 the third party cannot distinguish which of the two data sets originates from the tag 102. Consequently the third party cannot readily obtain the personal details or permissions of the owner of the tag 102. The efficacy of the RFID transaction system 100 increases if more than one tag reader module 112 is employed as this increases the number of random signals that mask the output signal of the tag 102.

Furthermore, the RFID transaction system 100 can self-monitor for denial of service (DoS) attacks where a third party attempts to prevent usage of the system 100 by flooding the tag reader module 112 with spurious signals. In such an attack the tag reader module 112 receives so many signals that it cannot process them all and is rendered effectively unserviceable. A consequence of such a DoS attack is that whilst the tag reader module 112 receives the random identifier data via the data link 128 but the tag module 110 output signal is not received at the tag reader's aerial 126. The tag reader module's processor 114 runs a routine whereby if a pre-determined time interval is reached during which the random tag module 110 output signal is not received an alarm condition is generated and an alarm signal generated. For example, the alarm condition could cause a warning light to show on the SST 120, or the alarm condition could cause alarm data, signal, to be sent via a network to a control centre where appropriate action could be detailed.

It will be appreciated that, although described as comprising a single tag module 112, the transaction system 100 may comprise any suitable number of tag modules 112.

It will be further appreciated that, although described with reference to an unitary tag reader module 110 and tag module 112, the present invention may comprise a tag module 112 that is physically separate from the tag reader module 112. Where there are more than one tag modules 112 any, or all, of the tag modules may be physically separate from the tag reader module 110. In the case of a tag module 112 being physically separate from the tag reader module 110 the data link 128 may be a wireless data link, or a hardwired data link, if wireless the data link may be encrypted.

Figure 2:
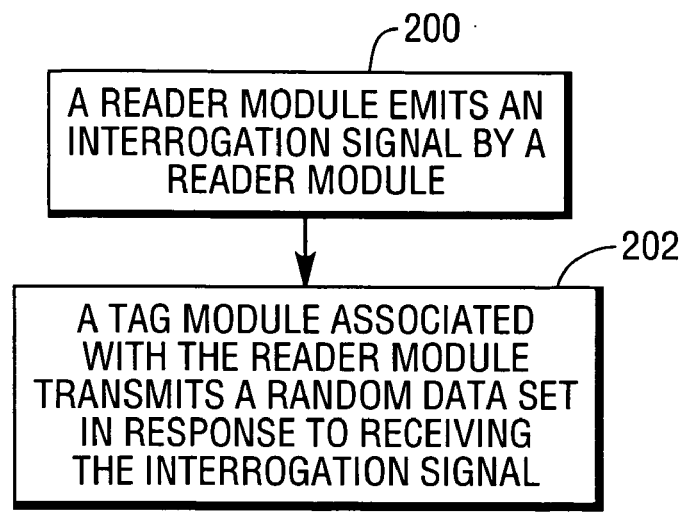
FIG. 2 is a flow chart detailing a method of reducing the likelihood of fraudulent interception of data transmitted from a RFID tag according to a further aspect of the present invention.

Referring now to FIG. 2, in order to reduce the likelihood of fraudulent interception of data transmitted from a RFID tag, a reader module emits an interrogation signal by a reader module (Step 200). A tag module associated with the reader module transmits a random data set in response to receiving the interrogation signal (Step 202).

Figure 3:
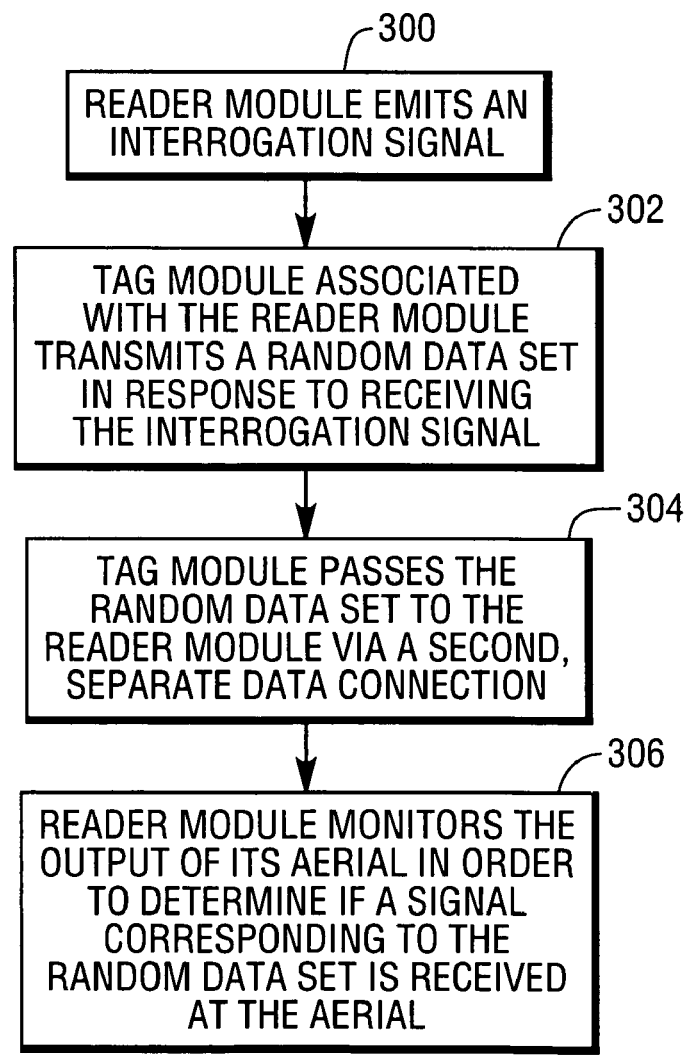
FIG. 3 is a flow chart detailing a method of detecting a denial of service attack according to another aspect of the present invention.

Referring now to FIG. 3, in order to detect a denial of service attack upon an RFID reader, a reader module emits an interrogation signal (Step 300). A tag module associated with the reader module transmits a random data set in response to receiving the interrogation signal (Step 302). The tag module passes the random data set to the reader module via a second data connection (Step 304). The reader module monitors the output of its aerial in order to determine if a signal corresponding to the random data set is received at the aerial. (Step 306). Typically, if no signal corresponding to the random data set is received at the aerial a denial of service alarm is raised, either at a terminal associated with the RFID reader or at a service centre.

Various modifications may be made to the above described embodiments within the scope of the present invention.

The invention claimed is:

1. A method of detecting a denial of service (DoS) attack, the method comprising:
   emitting an interrogation signal via an aerial of a reader module;
   transmitting a random data set via an aerial of a tag module which is other than a radio frequency identification (RFID) tag and which is associated with the reader module in response to receiving the interrogation signal from the reader module;
   passing the random data set from the tag module to the reader module via a data connection which is other than between the aerial of the tag module and the aerial of the reader module; and
   monitoring output of the aerial of the reader module to determine if a signal corresponding to the random data set passed from the tag module is received at the aerial of the reader module.

2. A method according to claim 1, further comprising:
   generating an alarm signal indicative of a DoS attack if a signal corresponding to the random data set passed from the tag module is not received at the aerial of the reader module.

3. An RFID transaction system comprising an RFID tag apparatus according to claim 1.

4. A radio frequency identification (RFID) tag apparatus comprising:
   at least one tag module which is other than an RFID tag and which is arranged to transmit first random identification data via a first data link in response to an interrogation signal; and
   a reader module which is arranged to (i) emit an interrogation signal, (ii) receive tag identification data from an RFID tag when the RFID tag is present, (iii) receive via the first data link the first random identification data which has been transmitted by the at least one tag module in response to receiving the interrogation signal emitted by the reader module, and (iv) discriminate between the tag identification data received from the RFID tag and the first random identification data received via the first data link from the at least one tag module which is other than an RFID tag;
   wherein (i) the at least one tag module which is other than an RFID tag is further arranged to transmit second random identification data via a second data link which is different from the first data link to the reader module, and (ii) the reader module is further arranged to receive via the second data link the second random identification data which has been transmitted by the at least one tag module so that the reader module can discriminate between the tag identification data received from the RFID tag and the first random identification data received via the first data link based upon the second random identification data received via the second data link.

5. An RFID tag apparatus according to claim 4, wherein the reader module is further arranged to (i) monitor the first random identification data received via the first data link from the at least one tag module, (ii) monitor the second random identification data received via the second data link from the at least one tag module, and (iii) generate an alarm signal when the second random identification data is received via the second data link and the first random identification data is not received via the first data link.

6. An RFID tag apparatus according to claim 4, wherein the reader module generates an alarm signal indicative of a denial of service (DoS) attack.

7. An RFID tag apparatus according to claim 4, wherein (i) the first data link comprises a wireless data link, and (ii) the second data link comprises a hardwired data link.

8. An RFID tag reader according to claim 4, wherein (i) the first data link comprises a wireless data link, and (ii) the second data link comprises a wireless data link.

9. An RFID tag apparatus according to claim 8, wherein (i) the at least one tag module includes a first aerial, and (ii) the reader module includes a second aerial which cooperates with the first aerial to provide the wireless first data link.

10. An RFID tag apparatus according to claim 4, wherein the at least one tag module comprises a plurality of tag modules in which each of the plurality of tag modules is arranged to transmit respective random identification data in response to receiving the interrogation signal emitted by the reader module.

11. An RFID tag apparatus according to claim 4, wherein the tag module is unitary with the reader module.

12. An RFID tag apparatus according to claim 4, wherein the tag module is physically separate from the reader module.

\* \* \* \* \*